United States Patent
Gallop et al.

(10) Patent No.: US 8,291,393 B2
(45) Date of Patent: Oct. 16, 2012

(54) JUST-IN-TIME COMPILER SUPPORT FOR INTERRUPTIBLE CODE

(75) Inventors: Patrick G. Gallop, Markham (CA); Derek Bruce Inglis, Markham (CA); Mark Graham Stoodley, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1441 days.

(21) Appl. No.: 11/841,639

(22) Filed: Aug. 20, 2007

(65) Prior Publication Data

US 2009/0055814 A1 Feb. 26, 2009

(51) Int. Cl.
*G06F 9/44* (2006.01)
*G06F 9/45* (2006.01)

(52) U.S. Cl. .......................... 717/148; 717/116; 717/159
(58) Field of Classification Search .................. None
See application file for complete search history.

(56) References Cited

U.S. PATENT DOCUMENTS

| | | | |
|---|---|---|---|
| 5,619,706 A | 4/1997 | Young | |
| 6,223,340 B1 | 4/2001 | Detlefs | |
| 6,502,152 B1 | 12/2002 | Laurenti | |
| 6,634,023 B1 | 10/2003 | Komatsu et al. | |
| 7,089,272 B1 | 8/2006 | Garthwaite et al. | |
| 7,171,501 B2 | 1/2007 | Bollella et al. | |
| 2002/0112227 A1* | 8/2002 | Kramskoy et al. | 717/148 |
| 2004/0148550 A1 | 7/2004 | Swoboda | |
| 2004/0153636 A1 | 8/2004 | Kamiya et al. | |
| 2004/0243792 A1* | 12/2004 | Stoodley | 712/244 |
| 2004/0250240 A1* | 12/2004 | Stoodley et al. | 717/116 |
| 2005/0262491 A1 | 11/2005 | Gu | |
| 2006/0048114 A1* | 3/2006 | Schmidt | 717/148 |
| 2006/0132817 A1* | 6/2006 | Dodge et al. | 358/1.13 |
| 2006/0190934 A1* | 8/2006 | Kielstra et al. | 717/148 |
| 2006/0200809 A1 | 9/2006 | Grcevski et al. | |
| 2008/0244239 A1* | 10/2008 | DeWitt et al. | 712/220 |
| 2009/0222798 A1* | 9/2009 | Iguchi et al. | 717/148 |
| 2009/0235034 A1* | 9/2009 | Holt | 717/148 |
| 2009/0271866 A1* | 10/2009 | Liske | 717/116 |
| 2009/0276766 A1* | 11/2009 | Song et al. | 717/159 |
| 2010/0199257 A1* | 8/2010 | Biggerstaff | 717/116 |
| 2011/0071816 A1* | 3/2011 | Bohizic et al. | 717/148 |
| 2012/0079465 A1* | 3/2012 | Harvey | 717/159 |

OTHER PUBLICATIONS

Derek L. Bruening, "Efficient, Transparent, and Comprehensive Runtime Code Manipulation", Sep. 2004, Massachusetts Institute of Technology, pp. 1-306 <http://groups.csail.mit.edu/cag/rio/derek-phd-thesis.pdf>.*

(Continued)

*Primary Examiner* — Thuy Dao
*Assistant Examiner* — Ben Wang
(74) *Attorney, Agent, or Firm* — Yee & Associates, P.C.; David A. Mims, Jr.

(57) ABSTRACT

A computer implemented method for performing inlining in a just-in-time compiler. Compilation of a first code of a program is begun. The first code is one of an interruptible code and a non-interruptible code. A try region is established around a second code of the program to form a wrapped second code. The try region is a boundary between interruptible and non-interruptible code such that a third code that modifies an observable state of the program cannot be moved across the boundary. The second code is, relative to the first code, the other of the interruptible code and the non-interruptible code. The wrapped second code is inlined with the first code during compilation. Compilation of the first code is completed to form a resultant code. The resultant code is stored.

20 Claims, 4 Drawing Sheets

OTHER PUBLICATIONS

Fulton et al., "Compilation Techniques for Real-Time Java Programs", 2007 IEEE, CGO'07, pp. 1-11 <http://ieeexplore.ieee.org/stamp/stamp.jsp?tp=&arnumber=4145117>.*

Liu et al., "Interruptible Iterators", Jan. 2006 ACM, POPL'06, pp. 1-12 <http://dl.acm.org/results.cfm?h=1&cfid=106665404&cftoken=38691459>.*

Brosgol et al., "Asynchronous Transfer of Control in the Real-Time Specification for Java", Proceedings of the Fifth IEEE International Symposium on Object-Oriented Real-Time Distributed Computing (ISORC'02), 2002, pp. 1-8.

Hsieh et al., "Optimizing NET Compilers for Improved Java Performance", IEEE Computer, vol. 30, No. 6, Jun. 1997, pp. 67-75.

* cited by examiner

SOURCE CODE 300 → COMPILER 302 → EXECUTABLE CODE 304

*FIG. 4 (PRIOR ART)*

```
400
void foo() {
    bar();
         402
}
```

*FIG. 5 (PRIOR ART)*

```
400
void foo() {
    {INLINED CODE FOR BAR()};
                              500
}
```

*FIG. 6*

```
600
void foo() {
    try{ 602            604
        //inlined code for bar()
    } catch (Exception e) {
        throw e;
               606
    }
}
```

JUST-IN-TIME COMPILER SUPPORT FOR INTERRUPTIBLE CODE

BACKGROUND OF THE INVENTION

1. Field of the Invention

The present invention relates generally to an improved data processing system and in particular to the compilation of computer usable program code. Still more particularly, the present invention relates to just-in-time compiler support for interruptible code.

2. Description of the Related Art

Compilers are software programs used to translate program instructions written in a source language to equivalent program instructions written in a target language. The source language is often a high-level language designed to be interpreted by humans. The target language is often a low-level language suitable for execution by computer hardware. Thus, the compiler is said to compile the source code into executable code.

Optimizing compilers are used to improve the quality of the program instruction generated without changing the intended meaning of the source code. For example, an optimizing compiler can reduce the time required to execute the program instructions or the memory footprint of the resulting program. During the optimization process, the source code is often re-ordered so that commands are executed more efficiently. Methods are continually sought for improving the effectiveness of optimizing compilers.

SUMMARY OF THE INVENTION

The aspects of the present invention provide for a computer implemented method, apparatus, and computer usable program code for performing inlining in a just-in-time compiler. Compilation of a first code of a program is begun. The first code is one of an interruptible code and a non-interruptible code. A try region is established around a second code of the program to form a wrapped second code. The try region is a boundary between interruptible and non-interruptible code such that a third code that modifies an observable state of the program cannot be moved across the boundary. The second code is, relative to the first code, the other of the interruptible code and the non-interruptible code. Thus, if the first code is interruptible, then the second code is non-interruptible, but if the first code is non-interruptible, then the second code is interruptible. The wrapped second code is inlined with the first code during compilation. Compilation of the first code is completed to form a resultant code. The resultant code is stored.

In another illustrative embodiment, the try region has a single exception handler. In another illustrative embodiment, the third code is at least one of the first code, the second code, a part of the first code, a part of the second code, and combinations thereof.

In another illustrative embodiment a method further includes adding a pointer on a thread structure associated with the program. During execution of the resultant code, and when a thread associated with the thread structure should be interrupted, the pointer is set to an address of an interrupt exception object.

In another illustrative embodiment, at a time during execution of the resultant code, and other than when the thread should be interrupted, a value of the pointer is null. In another illustrative embodiment, during execution of the resultant code, and after an interrupt has been handled, the value is reset to null.

In another illustrative embodiment, fourth code is inserted inside a loop of the interruptible code so that, upon execution of the resultant code, a pending interrupt will be detected within one iteration of the loop being posted on the thread.

In another illustrative embodiment, the resultant code further comprises metadata. In this case, the metadata comprises a corresponding flag for all handlers of the resultant code. The flag indicates whether a code range associated with each handler is one of interruptible and non-interruptible.

In another illustrative embodiment, the resultant code is executed. Responsive to a determination that a current thread has thrown a current exception, program execution is directed, by a runtime system, to a first correct exception handler for a program point where the current exception was thrown and for a class of the current exception.

In another illustrative embodiment, responsive to a determination that a particular flag associated with the first correct exception handler indicates that the first correct exception handler is interruptible and that the current exception is an interrupt, the first correct exception handler is ignored. The runtime system searches for a new correct exception handler. The new correct exception handler is different than the first correct exception handler. A determination is made whether the new correct exception handler is a suitable non-interruptible exception handler. If the new correct handler is an unsuitable non-interruptible exception handler, searching is repeated. If the new correct exception handler is a suitable non-interruptible exception handler, the new correct exception handler is established as the exception handler for the current exception.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
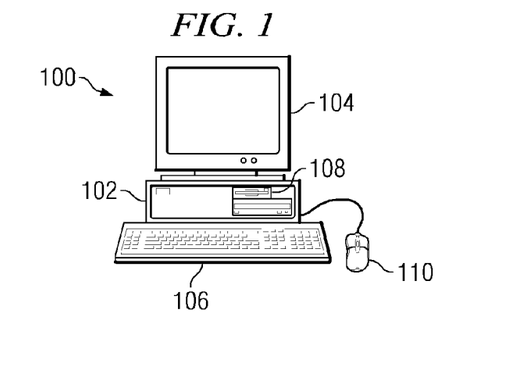
FIG. 1 is a pictorial representation of a data processing system in which the aspects of the present invention may be implemented.

With reference now to the figures and in particular with reference to FIG. 1, a pictorial representation of a data processing system is shown in which the aspects of the present invention may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 may be any suitable computer, such as an IBM® eServer™ computer or IntelliStation® computer, which are products of International Business Machines Corporation, located in Armonk, N.Y. Although the depicted representation shows a personal computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
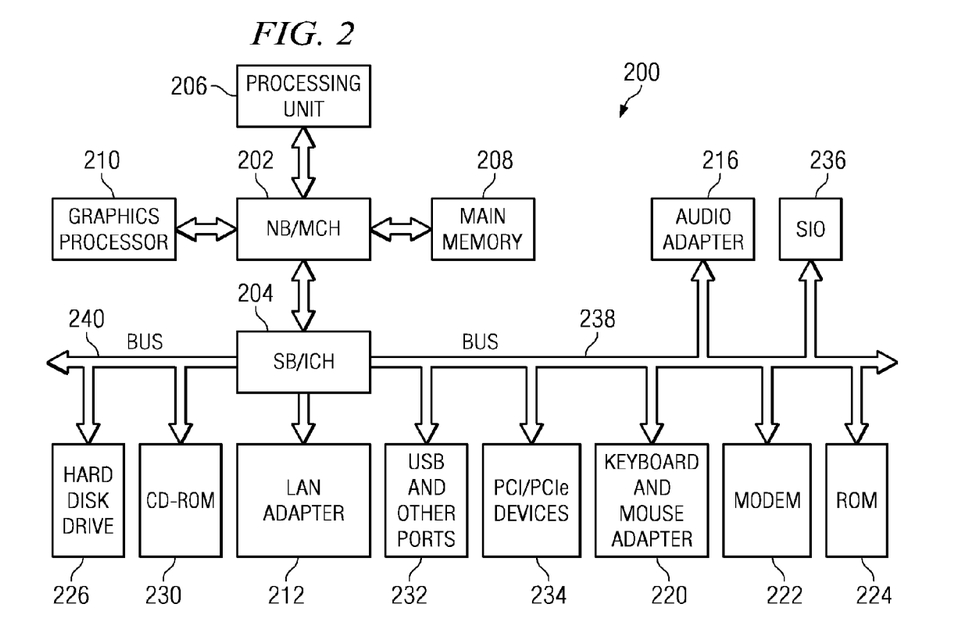
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system, such as Microsoft® Windows® XP (Microsoft and Windows are trademarks of Microsoft Corporation in the United States, other countries, or both). An object oriented programming system, such as the JAVA® programming system, may run in conjunction with the operating system and provides calls to the operating system from JAVA® programs or applications executing on data processing system 200 (JAVA® and all JAVA®-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention may be performed by processor 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache, such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide for a computer implemented method, apparatus, and computer usable program code for compiling source code. The methods of the present invention may be performed in a data processing system, such as data processing system 100 shown in FIG. 1 or data processing system 200 shown in FIG. 2. The methods of the present invention may be embodied in a computer-usable medium containing computer-usable program code executable by a processor of a data processing system.

As used herein, the following terms have the following meanings:

"Code" is a set of one or more instructions for use in a data processing system.

A "compiler" is a computer program that translates a series of program instructions written in a source computer language into program instructions written in a target computer language, or otherwise modifies the code of the source code. A "compiler" can also be an "optimizing compiler."

An "optimizing compiler" is a computer program that modifies program source code in order to generate executable code that makes efficient use of the hardware resources available on the target machine. The word "optimization" and related terms are terms that refer to improvements in speed, size, and/or efficiency of a computer program, and do not purport to indicate that a computer program has achieved, or is capable of achieving, a perfectly speedy or perfectly efficient state.

A "just-in-time" compiler, also known as a JIT compiler, is a compiler that performs compilation of a program at runtime of that program. Thus, using a JIT compiler, source code is compiled just before the resultant executable code is to be executed.

A thread, or thread of execution, is a fork of execution in a program that can run simultaneously with other forks of execution of the program. Thus, threads of execution are a way for different aspects or subroutines of a program to be executed simultaneously, in order to increase the speed or performance of overall execution of the program.

"Inlining" or "inline expansion" is an optimization technique performed upon code during compilation such that a function call site is expanded into a version of the function which is called.

"Metadata" is data that describes a second set of data. Metadata can take many forms, though in some way metadata is associated with the second set of data.

A "handler," "interrupt handler," or "interrupt service routine" (ISR), is a callback subroutine in an operating system or a device driver whose execution is triggered by the reception of an interrupt. A handler has many functions, which vary based on the reason the interrupt was generated and/or the speed at which the handler completes its task.

A "stack" or "call stack" is a temporary abstract data structure or data type which stores information about active subroutines of a computer program. An active subroutine is a subroutine which has been called, but has not yet completed execution by returning.

The "real-time specification for JAVA®" (RTSJ) is a set of interfaces and behavioral specifications that allow for real time programming in the JAVA® programming language.

"Interruptible code" is code that can be interrupted during execution.

"Non-interruptible code" is code that cannot be interrupted during execution.

"Interruption" of code means transferring execution of the code to a particular execution handler designed to handle the interrupt.

An "interrupt" is a particular class of exception that a first thread of execution can throw onto a second thread of execution. The second thread of execution is interrupted by the throwing of the interrupt by the first thread of execution.

A "try region" is a boundary between interruptible and non-interruptible code such that a third code that modifies an observable state of the program cannot be moved across the boundary. The try region has at least one exception handler that handles exceptions of a particular class. If the exception is thrown while the try region is executed by a current thread, the thread's execution may be directed by a runtime system to one of the at least one exception handlers if the class of the exception is an instance of the particular class handled by the at least one exception handler. If the exception is not an instance of the particular class, then the runtime system will search for the next outermost try region which covers the program point where the exception was thrown.

"Wrapped code" is code that is contained within a try region.

Figure 3:
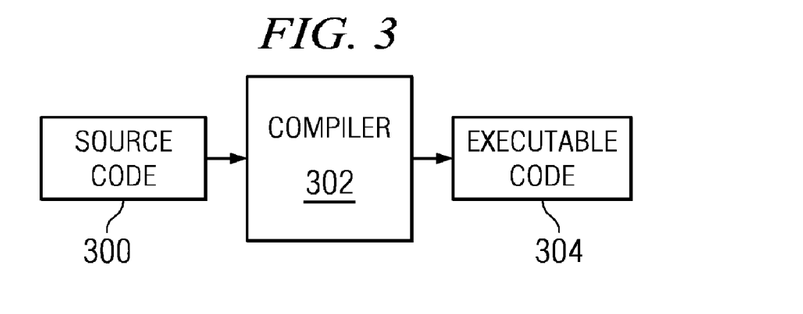
FIG. 3 is a block diagram of a prior art compiler, in which aspects of the present invention may be implemented.

FIG. 3 is a block diagram of a known compiler. Source code 300 is created by one or more of a number of known techniques, such as automatically, or by a human programmer. Compiler 302 and executable code 304 are computer usable programs that can be used in a data processing system, such as data processing system 100 in FIG. 1 or data processing system 200 in FIG. 2.

Source code 300 defines how a program will eventually operate, though source code 300 is usually not in a desired format for execution on a data processing system. Instead, source code 300 is often in a format that is easier for a human to interpret. After source code 300 has been defined, source code 300 is provided to compiler 302. A typical compiler is a computer program that translates a series of statements written in a first computer language, such as source code 300, into a second computer language, such as executable code 304. The second computer language, such as executable code 304, is often called the object or target language.

Thus, compiler 302 is, itself, a computer program designed to convert source code 300 into executable code 304. After compiler 302 has performed its programmed actions on source code 300, compiler 302 outputs executable code 304. Executable code 304 is generally in a desired computer-usable format and is ready for use in a data processing system.

Typical compilers output objects that contain machine code augmented by information about the name and location of entry points and external calls to functions not contained in the object. A set of object files, which need not have come from a single compiler provided that the compilers used share a common output format, may then be linked together to create the final executable code. The executable code can then be run directly by a user.

Most compilers translate a source code text file, written in a high level language, to object code or machine language, such as an executable .EXE or .COM file that may run on a computer or a virtual machine. However, translation from a low level language to a high level language is also possible. Such a compiler is normally known as a decompiler if the compiler is reconstructing a high level language program which could have generated the low level language program. Compilers also exist which translate from one high level language to another high level language, or sometimes to an intermediate language that can benefit from further processing.

The aspects of the present invention provide for a computer implemented method, apparatus, and computer usable program code for performing inlining in a just-in-time compiler. Compilation of a first code of a program is begun. The first code is one of an interruptible code and a non-interruptible code. A try region is established around a second code of the program to form a wrapped second code. The try region is a boundary between interruptible and non-interruptible code such that a third code that modifies an observable state of the program cannot be moved across the boundary. The second code is, relative to the first code, the other of the interruptible code and the non-interruptible code. Thus, if the first code is interruptible, then the second code is non-interruptible, but if the first code is non-interruptible, then the second code is interruptible. The wrapped second code is inlined with the first code during compilation. Compilation of the first code is completed to form a resultant code. The resultant code is stored.

Figure 4:
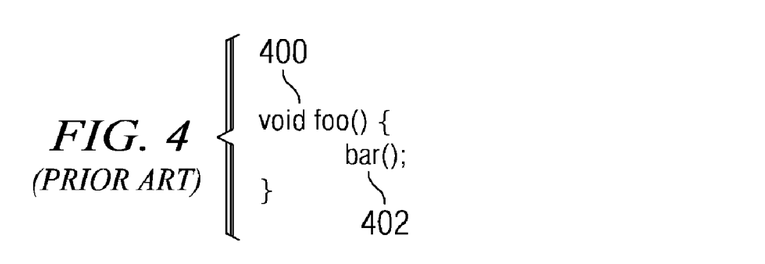
FIG. 4 shows pseudo-code to be optimized in a compiler, in which aspects of the present invention may be implemented.

FIG. 4 shows pseudo-code to be optimized in a compiler, in which aspects of the present invention may be implemented. The pseudo code shown in FIG. 4 can be implemented in a data processing system, such as data processing system 100 shown in FIG. 1, or data processing system 200 shown in FIG. 2. The pseudo code shown in FIG. 4 can be optimized in a compiler, such as compiler 302 shown in FIG. 3. Function foo 400 calls function bar 402. Function Bar 402 performs some function, the result of which is inserted into function foo 400 during execution.

Figure 5:
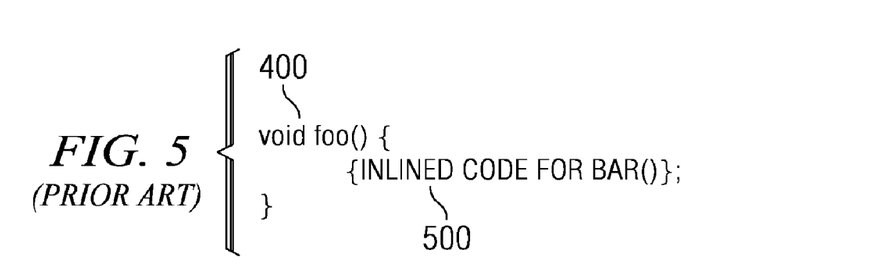
FIG. 5 shows the pseudo-code of FIG. 4 after inlining, in which aspects of the present invention may be implemented.

FIG. 5 shows the pseudo-code of FIG. 4 after inlining, in which aspects of the present invention may be implemented. The pseudo code shown in FIG. 5 can be implemented in a data processing system, such as data processing systems 100 of FIG. 1, or data processing system 200 shown in FIG. 2. The pseudo code shown in FIG. 5 benefits from inlining during compilation of the pseudo code shown in FIG. 4.

The pseudo code shown in FIG. 5 shows that function bar 402 in FIG. 4 has been replaced with the actual code that performs function bar 402. Thus, in FIG. 5 inlined code for bar 500 has been substituted for function bar 402 in FIG. 4. This substitution is often referred to as inlining.

Inlining can be an important optimization. Depending on the code, without inlining function foo 400 of FIG. 4 performs more slowly. Function foo 400 of FIG. 4 performs more slowly because the data processing system must temporarily suspend execution of function foo 400, then call function bar 402 of FIG. 4, then execute function bar 402, then return the result to function foo 400, and finally continue execution of function foo 400. Thus, without inlining, the execution of the code shown in FIG. 4 is akin to making a phone call to ask someone to add numbers for you, when you yourself can perform the addition more quickly. The additional time associated with making the extra call is considered to be undesirable and is to be avoided. Thus, inlining provides a method for increasing the performance of an executable code.

However, a problem can arise when either function foo 400 or function bar 402, of FIG. 4, is interruptible or uninterruptible code. Additional problems can arise when one of those functions is interruptible and the other function is non-interruptible. These problems can be especially difficult in certain versions of the JAVA® programming language.

The real time specification for JAVA® defines support and semantics for asynchronous transfer of control. Asynchronous transfer of control is a transfer of control within a thread of execution, triggered not by the thread itself, but rather by some action by another thread or by an event handler.

Asynchronous transfer of control is supported by interpreted code, ahead-of-time compiled code, and just-in-time compiled code. Asynchronous transfer of control can result in transfer of program control at unpredictable points. Asynchronous transfer of control is complicated to specify and implement. In the absence of compiler or JAVA® virtual machine optimizations, asynchronous transfer of control may incur a performance penalty even for programs that do not use asynchronous transfer of control.

Nevertheless, asynchronous transfer of control allows for expression of a number of common situations in real time programs. For example, asynchronous transfer of control allows expression of timing out on a computation. In this example, a most accurate result in a fixed amount of time can be determined. Other common expressions include termination of a thread or aborting one iteration of a loop during execution of a program.

While a code interpreter is somewhat limited in how the code interpreter implements the semantics of asynchronous transfer of control, the just-in-time compiler has considerably more flexibility. Specifically, the mechanisms used to identify interruptible code versus interrupt deferred code, also known as asynchronous transfer of control deferred code in the real time specification for JAVA®, can be implemented more efficiently in a just-in-time compiler as opposed to in an interpreter.

However, a problem arises when inlining is performed in code which is written in a language that supports asynchronous transfer of control, such as JAVA®. More particularly, the problem arises when inlining interruptible code into non-interruptible code, or when inlining non-interruptible code into interruptible code. In most cases, programming language code is explicitly marked as interruptible or non-interruptible because the behavior of a program may be unpredictable or undesirable if an interrupt handler cannot identify the program point where an interrupt occurs as being interruptible code or non-interruptible code. Additionally, interruptible code may have special exception semantics which are to be communicated to an exception handler or stack walker, such as, for example, to ignore exception handlers in interruptible code.

Figure 6:
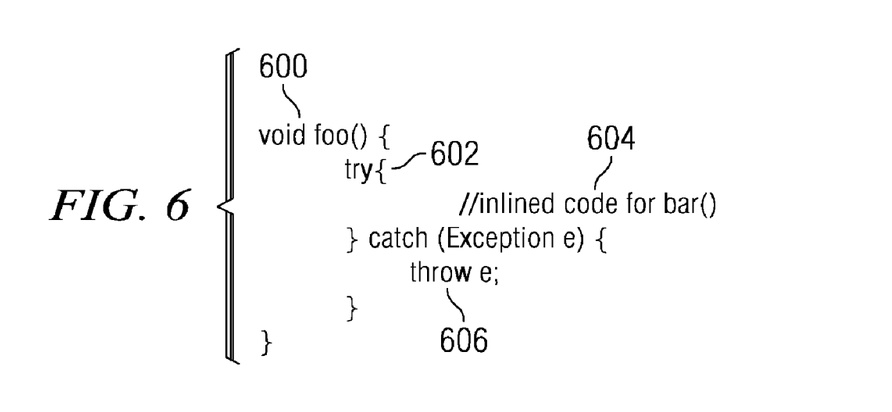
FIG. 6 shows the pseudo-code of FIG. 4 after inlining using a try region, in accordance with an illustrative embodiment.

FIG. 6 shows the pseudo-code of FIG. 4 after inlining using a try region, in accordance with an illustrative embodiment. The pseudo code shown in FIG. 6 can be implemented in data processing system, such as data processing systems 100 shown in FIG. 1, or data processing system 200 shown in FIG. 2. The pseudo code shown in FIG. 6 can be inlined using a compiler, such as compiler 302 shown in FIG. 3.

In the illustrative example shown in FIG. 6, inlining has been performed during compilation in order to insert the code for function bar 402 into function foo 600. In the illustrative example shown, try region 602, designated by the area between the brackets just after the word "try," is established to create a crisp boundary between function foo 600 and inlined code for function bar 604. In the illustrative example shown in FIG. 6, either function foo 600 or the inlined code for function bar 604 is interruptible, while the other function is non-interruptible.

When inlining an interruptible method or code into a non-interruptible code, or vice versa, the entire body of the inlined code or method is wrapped into try region 602. Try region 602 serves two functions. First, try region 602 guarantees a crisp boundary between interruptible code and non-interruptible code. The code that modifies the observable program state cannot be moved across this boundary. Thus, code that is interruptible behaves as interruptible code, and code that is not interruptible behaves as non-interruptible code, despite that fact that one type of code is inlined into the other.

Thus, for example, try region 602 does not modify the exception behavior of function bar. Instead, try region 602 re-throws any exception that propagates out of the inline code for function bar 604. For example, the term "throw e" throw statement 606 re-throws any exception that propagates out of the inline code for function bar 604 so that, if an exception not related to thread interruption is thrown in the inline code for function bar 604 that is not handled by some exception handler in function bar 604, the exception will be temporarily caught by the handler for try region 602. Such exceptions will be immediately re-thrown, however, by throw statement 606 which matches the behavior expected in the original program in FIG. 4.

The second function performed by try region 602 is to allow a single exception handler to cover the entire range of code contained in try region 602. Thus, the single exception handler for the try region 602 is a convenient place to identify whether that particular range of code is interruptible or non-interruptible.

In an illustrative example, the presence of an interrupt request is represented as a pointer on the current thread structure. The thread structure holds information relevant for execution of the current thread, or the environment of the current thread. A pointer is added to this thread structure. The pointer can be referred to as "a pending interrupt." When the thread should be interrupted, this pointer is set to the address of an interrupt exception object. Until that exception occurs, the pointer value is null. When an interrupt has been handled, the pointer value is again reset to null.

In an illustrative embodiment, interrupt requests for an executing thread are detected as soon as possible. In this case, a special operation is inserted into the interruptible code at any point when execution is about to transfer to non-interruptible code. This operational code can be referred to as "InterruptCheck." InterruptCheck is inserted on entry to an interruptible method or code and at every exit from the interruptible method or code. Typical exits include normal returns or exception threads.

In certain interruption policies, such as in the asynchronous transfer of control support for the real time specification for JAVA®, synchronized code in an interruptible method is supposed to act like non-interruptible code. In this case, the InterruptCheck operational code is also inserted before the outermost monitorenter byte codes, or lock byte codes, in an interruptible method or code. Similarly, the InterruptCheck operational code is also inserted after the outermost monitorexit byte codes, or unlock byte codes, in the interruptible method or code.

In addition to responsiveness, the InterruptCheck operational code is inserted inside loops of the program so that the pending interrupt will be detected within one loop iteration of the pending interrupt being posted on the thread. InterruptCheck operations are only inserted into code that is provably interruptible. For example, these operations need not be inserted into nested synchronization.

In another illustrative embodiment, metadata is used to communicate attributes of a method or code from the just-in-time compiler to the runtime system. An important aspect of this metadata is exception handling metadata. Exception handling metadata includes an ordered list of code ranges, as well as the exception handler entry point and the exception classes handled by those handlers. With this data, a stack walker or exception handling runtime can search for any particular program location, such as where an exception has occurred in the list of code ranges. The handler with the range that holds the desired program counter value and handles an exception class that matches or is a super class of a current exception, is the handler that will be executed next. The stack walker or exception handling runtime finds this handler and directs execution to the associated exception handler.

In an illustrative embodiment, a flag is added to this exception handling metadata. In another illustrative embodiment, a flag is added for each handler to indicate whether the code range associated with the corresponding handler is interruptible or non-interruptible. Because inlined code is explicitly wrapped in a try region, in the illustrative embodiments, the handler for the inlined code and the flag for this handler can be appropriately set.

The flag for any exception handlers, in a method such as function foo 600, that handle exceptions for code regions that are interruptible are set, even if these handlers were not introduced by try region 602 that wraps an inlined function. For example, if an inlined interruptible method, such as function bar 604, contains a try region that is not contained within synchronized code, then the flag for the handler for the try region is also be set. The compiler can determine the proper setting of the flag for a particular exception handler by simulating an exception being thrown from the particular exception handler. If the simulated exception thrown from the particular exception handler can reach another exception handler whose flag is set, indicating that the other exception handler is interruptible, then the flag for the particular exception handler should also be set to interruptible. Similarly, if the flag for the other exception handler is not set, indicating that the other exception handler is not interruptible, then the flag for the particular exception handler should also be cleared to indicate that the particular exception handler is not interruptible. If the simulated exception will be thrown from the method (function foo 600) without reaching another exception handler, then the flag for the particular exception handler should be set if the method (function foo 600) is identified as interruptible; otherwise, the flag should be cleared.

In another illustrative embodiment, a new check is inserted to determine if the handler covers a code range that is designated as interruptible. The new check is inserted, usually as a part of the system runtime code, in the code that determines which exception handler is to be invoked when an exception is thrown. A code range can be designated as interruptible via a flag, such as the flag described above.

Depending on the particular system being used, the exception handling semantics may be different when the code range containing the accepting instruction is interruptible. For example, the real-time specification for JAVA® indicates that handlers in an interruptible method are ignored when an interrupt occurs. In this way, interruptible code can be more abruptly terminated because exception handlers that would normally perform clean-up are not executed. For this reason, programmers explicitly mark methods as interruptible to enable this new exception handling semantics.

In another illustrative embodiment, the resultant code can be metadata. In this case, the meta-data comprises a corresponding flag for all handlers of the second code. The flag indicates whether a code range associated with the handlers is one of interruptible and non-interruptible.

In another illustrative embodiment, the resultant code is executed. During runtime, a runtime system or runtime routine determines whether a current thread has thrown a current exception. The runtime routine is invoked by the exception throwing action in order to determine where the thrown exception should be caught. Exceptions are caught by exception handlers, which are program locations that determine how exceptions are to be handled. Thus, if a current exception is thrown, then program execution is directed to a first correct exception handler for a program point where the current exception was thrown and for a class of the current exception.

The handler may not be in the same method where the exception is thrown. The handler could be several methods up the call stack. A call stack is a stack which stores information about the active subroutines of a computer program. The active subroutines are those subroutines which have been called but have not yet completed execution by returning.

Because the handler may not be in the same method where the exception is thrown, the runtime routine or runtime system walks the call stack by searching the metadata for exceptions to determine what exception handlers can catch the class of the exception handler. For example, an exception handler that catches NullPointerException will not catch an exception of class InterruptedException, so if the latter exception class is thrown, a determination is made which handler can handle the InterruptedException. The routine for runtime exception searches handlers from innermost scope to outermost scope, starting at the code location where the exception was thrown. Note that multiple correct exception handlers could possibly handle a given exception. The determination of which correct exception handler to choose is based on a variety of factors, as described further below.

Once a correct exception handler is chosen, the runtime system or runtime routine determines whether a particular flag associated with the first correct exception handler indicates that the first correct exception handler is interruptible. The runtime system or runtime routine also determines whether the current exception is an interrupt. In the case of the real time specification for Java®, if both cases are true, then the runtime system or runtime routine ignores the first correct exception handler. The runtime system then searches for a second correct exception handler, which is different than the first correct exception handler.

Stated differently, metadata is associated with all handlers. Those handlers that are associated with try regions that are in interruptible code have a flag in the metadata set to be interruptible. The flag indicates whether a code range associated with the exception handler is one of interruptible and non-interruptible. The runtime system determines whether an exception is thrown on a current thread. If an exception is thrown, then a runtime routine or runtime system will check the flag associated with each exception handler that might be the correct exception handler for the exception. The purpose of the runtime routine or runtime system is to direct execution to a correct exception handler for the exception. The runtime system or runtime routine then determines whether the exception is an interruption exception and further determines whether the flag indicates the handler is interruptible. If both cases are true, then the runtime routine or runtime system can skip a given handler to consider the correct exception handler for the exception.

Thus, the runtime system exception handler code can be modified so that, responsive to a determination that an exception is to be caught by an exception handler whose flag indicates that the exception handler is interruptible, the runtime system exception handler code applies the interruptible exception handling semantics to the handler. In the case of the real time specification for Java®, this result means that the first handler is ignored. Instead, the exception is propagated to the next outermost exception handler in the call stack. This process iterates until a non-interruptible handler is found.

Figure 7:
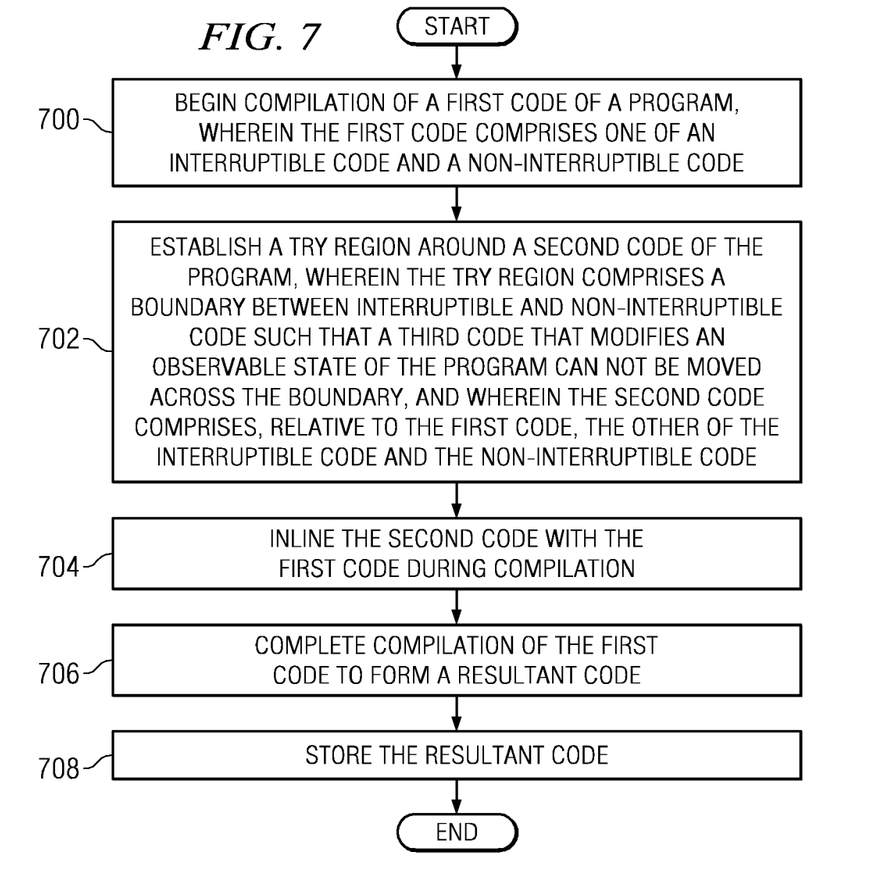
FIG. 7 is a flowchart illustrating inlining during compilation, in accordance with an illustrative embodiment.

FIG. 7 is a flowchart illustrating inlining during compilation, in accordance with an illustrative embodiment. The process shown in FIG. 7 can be implemented in a data processing system, such as data processing system 100 shown in FIG. 1 or data processing system 200 shown in FIG. 2. The process shown in FIG. 7 can be implemented in a compiler, such as compiler 302 shown in FIG. 3. The process shown in FIG. 7 can also be implemented in code, such as the pseudo code shown in FIG. 4.

The process begins as the compiler begins compilation of a first code of a program, wherein the first code comprises one of an interruptible code and a non-interruptible code (step 700). The compiler then establishes a try region around a second code or a program, wherein the try region comprises a boundary between interruptible and non-interruptible code such that a third code that modifies an observable state of the program cannot be moved across the boundary, and wherein the second code comprises, relative to the first code, the other of the interruptible code and the non-interruptible code (step 702). This try region is similar to the try region described with respect to FIG. 6. Thus, an example of the try region is provided in the pseudo code shown in FIG. 6.

The compiler then inlines the second code with the first code during compilation (step 704). Inlining or inline expansion is an optimization technique performed upon code during compilation such that a function call site is expanded into a version of the function which is called. For example, a first function calls a second function to perform a task. The second function performs, for example, the task of adding 2+2. The resulting value of 4, which is the output of the second function, is used in the first function. During compilation, part or all of the second function is inserted into the first function. While the size of the program may be increased by inlining, the performance of the compiled code for the first function usually improves because the processor no longer has the overhead of calling, or referring to, the second function.

The process continues as the compiler completes compilation of the first code to form a resulting code (step 706). The compiler then causes the resulting code to be stored (step 708). The process terminates thereafter.

Note that a pointer can be added on a thread structure associated with a program during runtime. During execution of the resultant code and when a thread associated with the thread structure should be interrupted, the pointer is set to an address of an interrupt exception object. As described with respect to FIG. 6, the presence of an interrupt request is represented as a pointer on the current thread structure. A pointer, which can be referred to as a pending interrupt, can be added to this thread structure. When a thread should be interrupted, the pending interrupt pointer is set to the address of an interrupt exception object. Until an exception occurs, the pointer value is null. After an interrupt has been handled, the pointer value is also returned to null.

Figure 8:
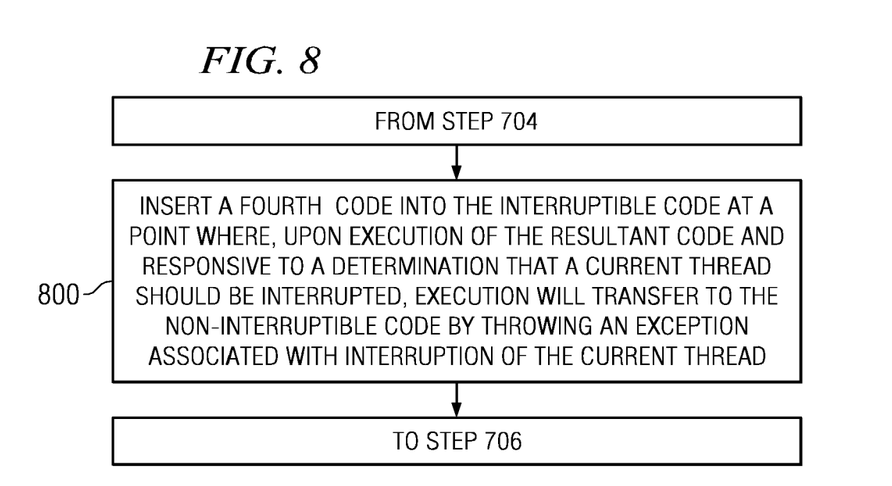
FIG. 8 is a flowchart illustrating inlining during compilation, in accordance with an illustrative embodiment.

FIG. 8 is a flowchart illustrating inlining during compilation, in accordance with an illustrative embodiment. The process shown in FIG. 8 can be implemented in a data processing system, such as data processing system 100 shown in FIG. 1 or data processing system 200 shown in FIG. 2. The process shown in FIG. 8 can be implemented in a compiler, such as compiler 302 shown in FIG. 3. The process shown in FIG. 8 can also be implemented in code, such as the code shown in FIG. 4.

The process shown in FIG. 8 is an extension of the method shown in FIG. 7. Thus, for example, from step 704 in FIG. 7, a fourth code is inserted into the interruptible code at a point where, upon execution of the resultant code, if there is an interrupt pending for the current thread, the pending interrupt will be thrown as an exception so that execution will transfer to a non-interruptible code (step 800).

As described with respect to FIG. 6, this code can be an InterruptCheck operational code. The InterruptCheck operational code can be inserted on entry to an interruptible method. In the case of the real-time specification for JAVA®, the InterruptCheck operational code is also inserted for outermost "monitorenter" byte codes, or lock byte codes, and after outermost "monitorexit" byte codes, or unlocked byte codes, in interruptible methods. In addition, for responsiveness, the InterruptCheck operational code can also be inserted inside loops of a program so that a pending interrupt will be detected within one loop iteration of the interrupt being posted on the thread. In any case, after inserting this fourth code, the process returns to step 706 in FIG. 7.

Figure 9:
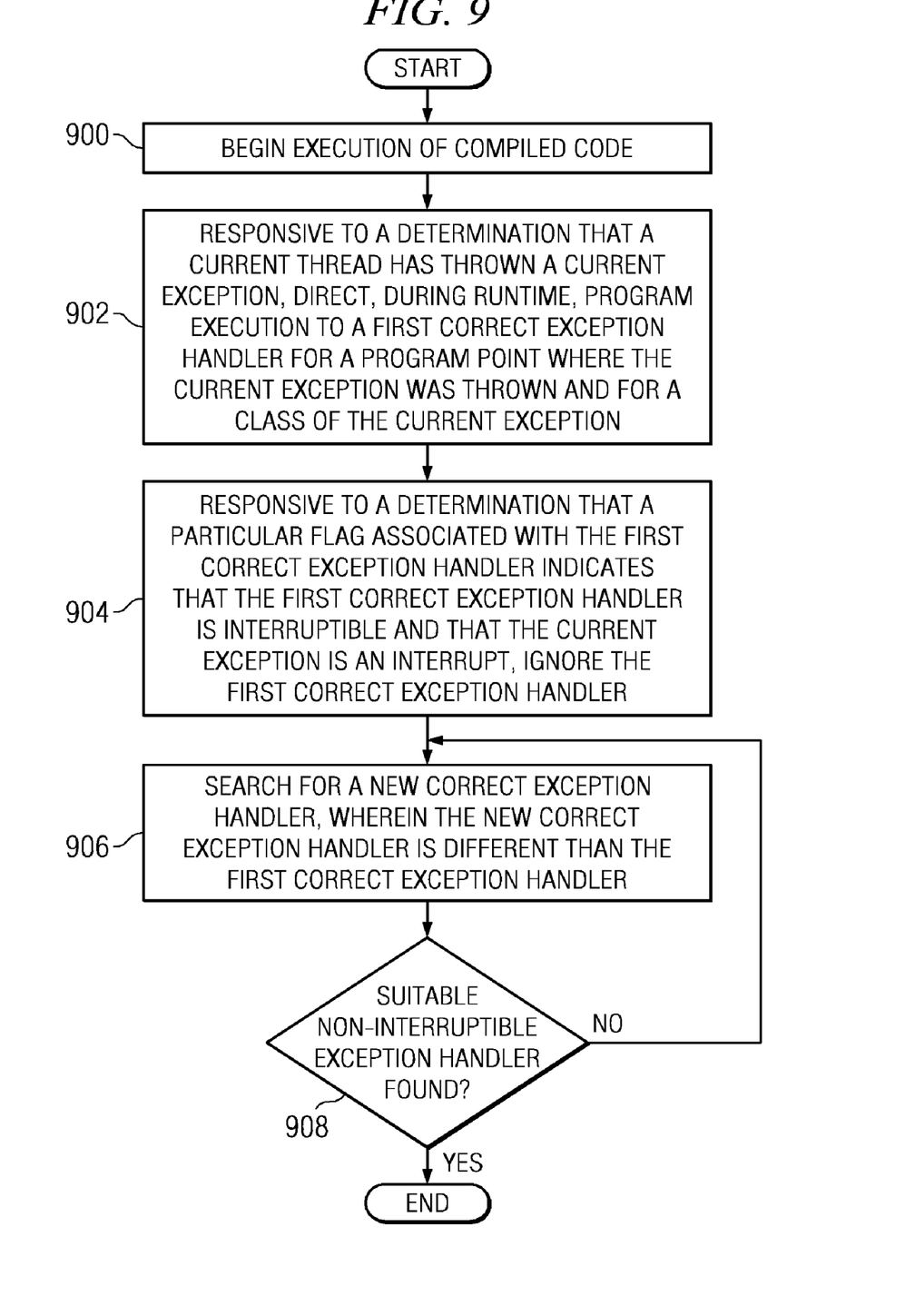
FIG. 9 is a flowchart illustrating modification of a runtime system that supports compiled code, in accordance with an illustrative embodiment.

FIG. 9 is a flowchart illustrating modification of a runtime system that supports compiled code, in accordance with an illustrative embodiment. The process shown in FIG. 9 can be implemented in a data processing system, such as data processing system 100 shown in FIG. 1 or data processing system 200 shown in FIG. 2. The process shown in FIG. 9 is implemented as a modification to the runtime system that supports compiled code.

The process begins as the data processing system begins execution of compiled code (step 900). Next, responsive to a determination that a current thread has thrown a current exception, the data processing system directs, during runtime, program execution to a first correct exception handler for a program point where the current exception was thrown and for a class of the current exception (step 902). Thereafter, responsive to a determination that a particular flag associated with the first correct exception handler indicates that the first correct exception handler is interruptible and that the current exception is an interrupt, the data processing system ignores the first correct exception handler (step 904). The data processing system then searches for a second correct exception handler, wherein the second correct exception handler is different than the first correct exception handler (step 906).

The data processing system then determines if a suitable non-interruptible exception handler is found (step 908). If a suitable non-interruptible exception handler is not found, then the process returns to step 906 and repeats. If a suitable non-interruptible exception handler is not found, then the process terminates.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for performing inlining in a just-in-time compiler, the method implemented by a computer, the method comprising:
    beginning compilation of a first code of a program, wherein the first code comprises an interruptible code and a non-interruptible code;
    establishing a try region around a second code of the program to establish a wrapped second code, wherein the try region comprises a boundary between the interruptible and non-interruptible code such that a third code that modifies an observable state of the program cannot be moved across the boundary, wherein the second code comprises, relative to the first code, the other of the interruptible code and the non-interruptible code, wherein the first code is different from the second code, and wherein the third code is different from the first code and the second code;
    inlining the wrapped second code with the first code during compilation;
    completing compilation of the first code having the wrapped second code inlined to form a resultant code; and
    storing the resultant code.

2. The method of claim 1 wherein the try region has a single exception handler.

3. The method of claim 1 wherein the third code comprises at least one of the first code, the second code, a frist part of the first code, a second part of the second code, and combinations thereof.

4. The method of claim 1 further comprising:
    adding a pointer on a thread structure associated with the program, wherein during execution of the resultant code and when a thread associated with the thread structure should be interrupted, the pointer is set to an address of an interrupt exception object.

5. The method of claim 4 wherein at a time during execution of the resultant code, and other than when the thread should be interrupted, a value of the pointer is null.

6. The method of claim 1 further comprising:
    inserting a fourth code into the interruptible code at a point where, upon execution of the resultant code and responsive to a determination that a current thread should be interrupted, execution will transfer to the non-interruptible code by throwing an exception associated with interruption of the current thread.

7. The method of claim 6 wherein the fourth code is inserted on entry to the interruptible code and at every exit from the interruptible code.

8. The method of claim 6 wherein the program is written in JAVA and wherein the program supports asynchronous transfer of control, and wherein the fourth code is inserted before outermost monitorenter byte codes and after monitorexit byte codes in the interruptible code.

9. The method of claim 6 wherein the fourth code is inserted inside a loop of the interruptible code so that, upon execution of the resultant code, a pending interrupt will be detected within one iteration of the loop being posted on the thread.

10. The method of claim 1 wherein the resultant code further comprises metadata, wherein the metadata comprises a corresponding flag for all handlers of the resultant code, and wherein the corresponding flag indicates whether a code range associated with the handlers is one of interruptible and non-interruptible.

11. The method of claim 10 further comprising:
executing the resultant code; and
responsive to a determination that a current thread has thrown a current exception, directing, during runtime, program execution to a first correct exception handler for a program point where the current exception was thrown and for a class of the current exception.

12. The method of claim 11, further comprising:
responsive to a determination that a particular flag associated with the first correct exception handler indicates that the first correct exception handler is interruptible and that the current exception is an interrupt, ignoring the first correct exception handler;
searching for a new correct exception handler, wherein the new correct exception handler is different than the first correct exception handler;
determining whether the new correct exception handler is a suitable non-interruptible exception handler;
responsive to the new correct handler being an unsuitable non-interruptible exception handler, repeating searching; and
responsive to the new correct exception handler being the suitable non-interruptible exception handler, establishing the new correct exception handler as the exception handler for the current exception.

13. A computer readable memory storing computer usable program code for performing inlining in a just-in-time compiler, wherein the computer usable program code comprises:
computer usable program code for beginning compilation of a first code of a program, wherein the first code comprises an interruptible code and a non-interruptible code;
computer usable program code for establishing a try region around a second code of the program to form a wrapped second code, wherein the try region comprises a boundary between the interruptible and non-interruptible code such that a third code that modifies an observable state of the program cannot be moved across the boundary, wherein the second code comprises, relative to the first code, the other of the interruptible code and the non-interruptible code, wherein the first code is different from the second code and wherein the third code is different from the first code and the second code;
computer usable program code for inlining the wrapped second code with the first code during compilation; and
computer usable program code for completing compilation of the first code having the wrapped second code inlined to form a resultant code.

14. The computer readable memory of claim 13 wherein the resultant code further comprises metadata, wherein the metadata comprises a corresponding flag for all handlers of the resultant code, and wherein the flag indicates whether a code range associated with the handlers is one of interruptible and non-interruptible.

15. The computer readable memory of claim 14 further comprising:
computer usable program code for executing the resultant code; and
computer usable program code for, responsive to a determination that a current thread has thrown a current exception, directing, during runtime, program execution to a first correct exception handler for a program point where the current exception was thrown and for a class of the current exception.

16. The computer readable memory of claim 15, further comprising:
computer usable program code for, responsive to the determination that a particular flag associated with the first correct exception handler indicates that the first correct exception handler is interruptible and that the current exception is an interrupt, ignoring the first correct exception handler;
computer usable program code for searching for a new correct exception handler, wherein the new correct exception handler is different than the first correct exception handler;
computer usable program code for determining whether the new correct exception handler is a suitable non-interruptible exception handler;
computer usable program code for, responsive to the new correct handler being an unsuitable non-interruptible exception handler, repeating searching; and
computer usable program code for, responsive to the new correct exception handler being the suitable non-interruptible exception handler, establishing the new correct exception handler as the exception handler for the current exception.

17. A data processing system comprising:
a bus;
at least one processor coupled to the bus;
a computer usable medium coupled to the bus, wherein the computer usable medium contains a set of instructions for performing inlining in a just-in-time compiler, wherein the at least one processor is adapted to carry out the set of instructions to:
begin compilation of a first code of a program, wherein the first code comprises an interruptible code and a non-interruptible code;
establish a try region around a second code of the program to form a wrapped second code, wherein the try region comprises a boundary between the interruptible and non-interruptible code such that a third code that modifies an observable state of the program cannot be moved across the boundary, and wherein the second code comprises, relative to the first code, the other of the interruptible code and the non-interruptible code, wherein the first code is different from the second code and wherein the third code is different from the first code and the second code;
inline the wrapped second code with the first code during compilation; and
complete compilation of the first code having the wrapped second code inlined to form a resultant code.

18. The data processing system of claim 17 wherein the resultant code further comprises metadata, wherein the metadata comprises a corresponding flag for all handlers of the resultant code, and wherein the flag indicates whether a code range associated with the handlers is one of interruptible and non-interruptible.

19. The data processing system of claim 18 wherein the at least one processor is further adapted to carry out the set of instructions to:
execute the resultant code; and
responsive to a determination that a current thread has thrown a current exception, direct, during runtime, program execution to a first correct exception handler for a program point where the current exception was thrown and for a class of the current exception.

20. The data processing system of claim 19, wherein the at least one processor is further adapted to carry out the set of instructions to:

responsive to the determination that a particular flag associated with the first correct exception handler indicates that the first correct exception handler is interruptible and that the current exception is an interrupt, ignore the first correct exception handler;

search for a new correct exception handler, wherein the new correct exception handler is different than the first correct exception handler;

determine whether the new correct exception handler is a suitable non-interruptible exception handler;

responsive to the new correct handler being an unsuitable non-interruptible exception handler, repeat searching; and     responsive to the new correct exception handler being the suitable non-interruptible exception handler, establish the new correct exception handler as the exception handler for the current exception.

\* \* \* \* \*